United States Patent
Kumar

(10) Patent No.: US 6,412,694 B1
(45) Date of Patent: Jul. 2, 2002

(54) PRODUCE RECOGNITION SYSTEM AND METHOD INCLUDING WEIGHTED RANKINGS

(75) Inventor: Alok Kumar, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 136 days.

(21) Appl. No.: 09/666,737

(22) Filed: Sep. 20, 2000

(51) Int. Cl.⁷ .................................................. G06K 7/10
(52) U.S. Cl. .......................... 235/462.01; 235/462.11; 235/462.14
(58) Field of Search ................................ 235/378, 385, 235/383, 462.01, 462.11, 462.14, 462.41, 462.42; 705/20, 23, 24

(56) References Cited

U.S. PATENT DOCUMENTS

| | | | |
|---|---|---|---|
| 3,774,014 A | * 11/1973 | Berler | 235/462.11 |
| 4,281,933 A | * 8/1981 | Houston et al. | 356/425 |
| 4,693,330 A | 9/1987 | Uchimura et al. | |
| 5,166,755 A | 11/1992 | Gat | |
| 5,546,475 A | 8/1996 | Bolle et al. | |
| 5,867,265 A | 2/1999 | Thomas | |
| 6,155,489 A | * 12/2000 | Collins, Jr. et al. | 235/462.01 |
| 6,260,023 B1 | * 7/2001 | Seevers et al. | 705/20 |
| 6,332,573 B1 | * 12/2001 | Gu et al. | 235/462.06 |

* cited by examiner

Primary Examiner—Michael G. Lee
Assistant Examiner—Daniel St. Cyr
(74) Attorney, Agent, or Firm—Paul W. Martin

(57) ABSTRACT

A produce recognition system and method which uses weighted rankings to increase the possibility that candidate identifications for a produce item will appear in the first-displayed screen of candidate identifications, rather than later screens accessed through operator scrolling. The system in includes a produce data collector which collects produce data for a produce item, and a computer system which compares the produce data to reference produce data to obtain a list of candidate identifications with first rankings based upon probability of match, determining weights for the candidate identifications based upon numbers of times the candidate identifications were correct identifications and were displayed in predetermined operator selection screen locations during past recognition events, applies the weights to the candidate identifications to obtain second rankings, displays the candidate identifications in order of the second rankings, and records an operator selection of one of the candidate identifications.

12 Claims, 4 Drawing Sheets

| PRODUCE ID | $N_1$ | $N_2$ | $N_3$ | $N_4$ | $N_5$ | $N_6$ | $N_7$ | $N_8$ | $N_9$ | T | D |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

PRODUCE RECOGNITION SYSTEM AND METHOD INCLUDING WEIGHTED RANKINGS

CROSS REFERENCE TO RELATED APPLICATIONS

The present invention is related to the following commonly assigned and U.S. applications:

"A Produce data collector And A Produce Recognition System", filed Nov. 10, 1998, invented by Gu, and having a Ser. No. 09/189,783 now U.S. Pat. No. 6,332,573.

BACKGROUND OF THE INVENTION

The present invention relates to product checkout devices and more specifically to produce recognition system and method including weighted rankings.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

A produce recognition system is disclosed in the cited co-pending application. A produce item is placed over a window in a spectral data collector, the produce item is illuminated, and the spectrum of the diffuse reflected light from the produce item is measured. A terminal compares the spectrum to reference spectra in a library. The terminal determines candidate produce items and corresponding ranks or confidence levels and chooses the candidate with the highest confidence level. The terminal additionally displays a number of candidates for operator verification and selection. The positions of the candidates are rank ordered.

However, a reference spectral waveform may not always be a unique reproducible signature of a produce item. Therefore, the terminal may not determine the same rank or even display a correct candidate each time the produce item is subjected to data collection.

Therefore, it would be desirable to supplement rankings based upon spectral analysis with information derived from limitations of using only spectral data.

SUMMARY OF THE INVENTION

In accordance with the teachings of the present invention, produce recognition system and method including weighted rankings is provided.

A produce recognition system and method which uses weighted rankings to increase the possibility that candidate identifications for a produce item will appear in the first-displayed screen of candidate identifications, rather than later screens accessed through operator scrolling. The system in includes a produce data collector which collects produce data for a produce item, and a computer system which compares the produce data to reference produce data to obtain a list of candidate identifications with first rankings based upon probability of match, determining weights for the candidate identifications based upon numbers of times the candidate identifications were correct identifications and were displayed in predetermined operator selection screen locations during past recognition events, applies the weights to the candidate identifications to obtain second rankings, displays the candidate identifications in order of the second rankings, and records an operator selection of one of the candidate identifications.

The method includes the steps of collecting produce data from the produce item, comparing the produce data to reference produce data to obtain a list of candidate identifications with first rankings based upon probability of match, determining weights for the candidate identifications based upon numbers of times the candidate identifications were correct identifications and were displayed in predetermined operator selection screen locations during past recognition events, applying the weights to the candidate identifications to obtain second rankings, displaying the candidate identifications in order of the second rankings, and recording an operator selection of one of the candidate identifications.

It is accordingly an object of the present invention to provide produce recognition system and method including weighted rankings.

It is another object of the present invention to improve the speed and accuracy of produce recognition.

It is another object of the present invention to augment produce data with additional data derived from inherent limitations of using the produce data to recognize produce items.

It is another object of the present invention to augment spectral data with additional data derived from inherent limitations of using the spectral data to recognize produce items.

It is another object of the present invention to increase the possibility that a candidate identification for a produce item will appear on a first-displayed candidate identification screen.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is an example choice location data file;

DETAILED DESCRIPTION OF THE PREFERRED EMBODIMENT

Figure 1:
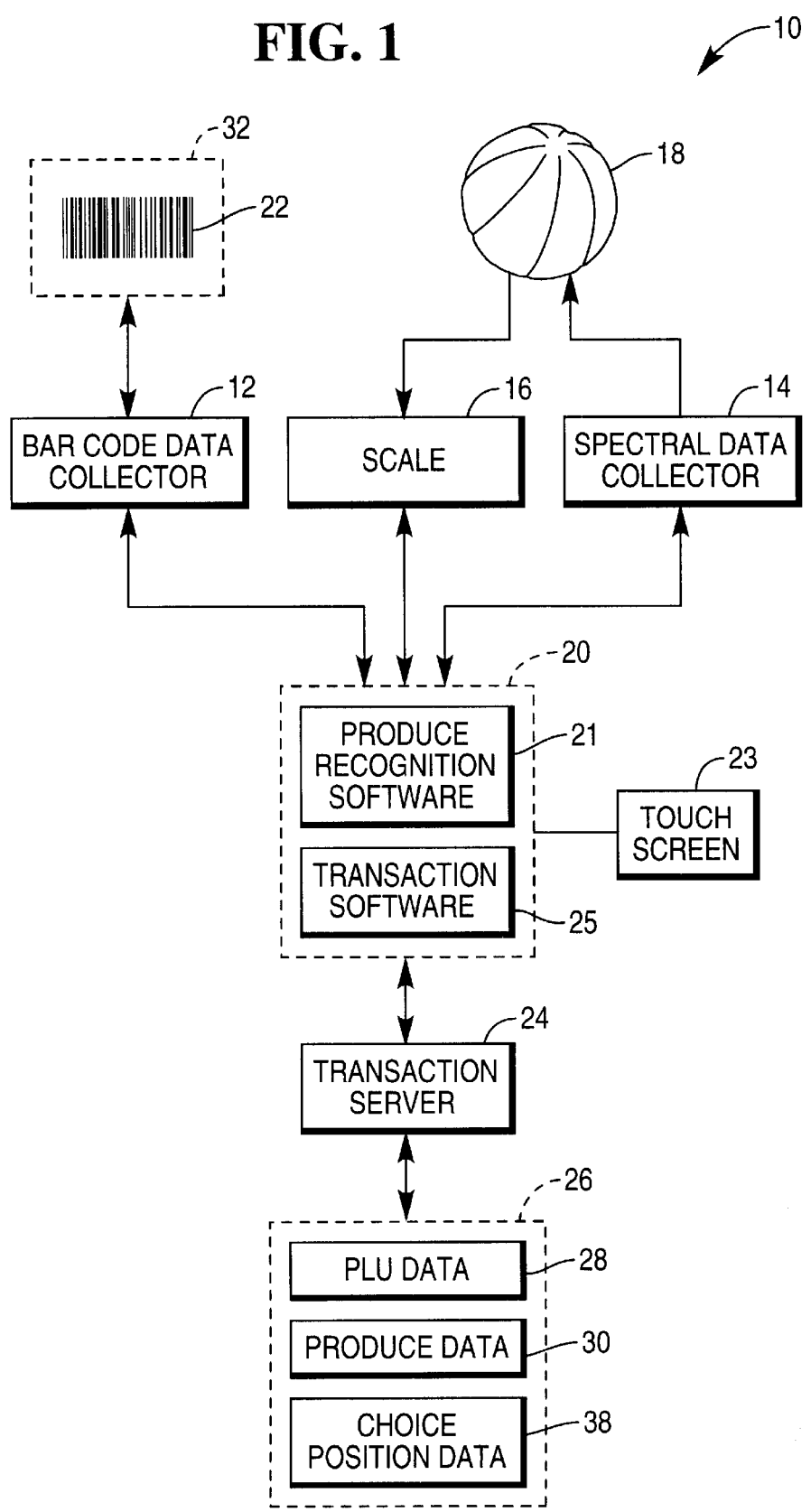
FIG. 1 is a block diagram of a transaction processing system including a produce recognition system.

Referring now to FIG. 1, transaction processing system 10 includes bar code data collector 12, spectral data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Spectral data collector 14 collects spectral data for produce item 18. Spectral data collector 14 preferably includes spectrometer 51 (FIG. 3) During a transaction, spectral data collector 14 may be self-activated when produce item 18 blocks ambient light from entering window 60 (FIG. 3), or initiated by placement of produce item 18 on scale 16 or by operator commands recorded by touch screen 23 (or other input device).

Bar code data collector 12 and spectral data collector 14 operate separately from each other, but may be integrated together. Bar code data collector 12 works in conjunction with transaction terminal 20 and transaction server 24.

Scale 16 provides weight information which not only helps determine the total price of produce item 18, and may additionally help to identify produce item 18.

Scale 16 may also work in connection with bar code data collector 12, but may be designed to operate and be mounted separately.

Choice position data 38 stores supplemental information for assisting with recognition of produce item 18.

Produce data 30 contains a library of reference data from previously collected and processed spectral produce data.

In the case of bar coded items, transaction terminal 20 obtains the item identification number from bar code data collector 12 and retrieves a corresponding price from PLU data 28 through transaction server 24.

In the case of non-bar coded produce items, transaction terminal 20 executes produce recognition software 21 which obtains spectral characteristics of produce item from spectral data collector 14, identifies produce item 18 by comparing produce data in produce data 30 with collected produce data, and retrieves an item identification number from produce data 30 and passes it to transaction software 25, which obtains a corresponding price from PLU data 28.

To assist in proper identification of produce items, produce recognition software 21 additionally displays candidate produce items for operator verification. Produce recognition software 21 preferably arranges the candidate produce items in terms of probability of match and displays them as text and/or color images in predetermined locations on an operator display of transaction terminal 20, such as touch screen 23. The operator may accept the most likely candidate returned by or override it with a different choice.

Transaction terminal 20 uses prior position information to supplement spectral identification. The prior information is used to adjust spectral rankings.

In an alternative embodiment, identification of produce item 18 may be handled by transaction server 24. Transaction server 24 receives collected produce characteristics and compares them with produce data in produce data 30. Transaction server 24 use supplemental information in choice position data 38 to refine the identification. Following identification, transaction server 24 obtains a price for produce item 18 and forwards it to transaction terminal 20.

Storage medium 26 preferably includes one or more hard disk drives. Produce data 30 and choice position data 38 are stored within storage medium 26, but either may also be located instead at transaction terminal 20. PLU data 28 is stored within storage medium 26, but may be located instead at transaction terminal 20 or bar code data collector 12.

Figure 2:
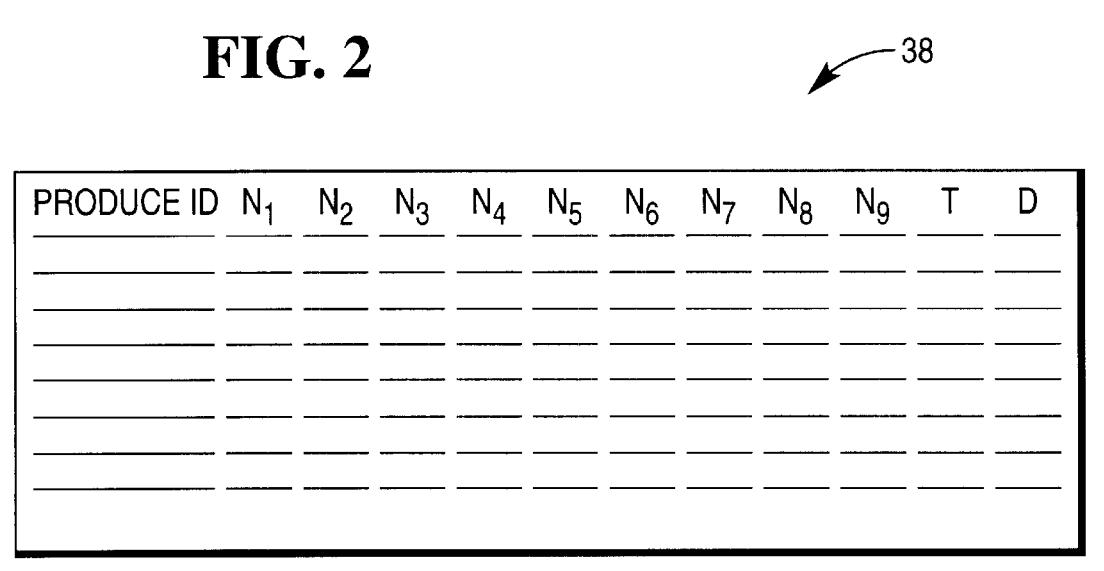

Turning now to FIG. 2, choice position data 38 is illustrated in detail.

Choice position data 38 stores information about the number of positions of candidate identifications to be displayed for operator verification and selection, and the number of times a correct candidate identification for produce item 18 is displayed in the available positions.

For purposes of this invention, the first location is the location of a candidate identification of highest probability or rank. The first location may be displayed anywhere and the other locations may be displayed anywhere and in any order. For example, for candidate identifications displayed as images of produce items, human factors studies may indicate that the images are best displayed in rank order by displaying them left to right and down in rows, starting with the first location.

Entry PRODUCE ID identifies a produce item identification number. Entries $N_1$ through $N_9$ identify the number of times the correct candidate identification for the produce item associated with PRODUCE ID has appeared in the corresponding choice location in past recognition events. Entry T identifies the total number of recorded entries $N_1$, through $N_9$ for the produce item. Entry D reflects the difficulty in placing the true identity in the first location given the inherent limitations of using spectral data. Thus, it is a measure of the difficulty in recognizing produce item 18 using only spectral data.

The expected location for the correct identity is determined by $$E_i = \frac{\sum_1^n N_i i}{\sum_1^n N_i}, \qquad (1)$$

where i is the choice position and n is the total number of positions. The denominator is entry T in location choice position data 38.

For example, suppose that the correct choice for produce item 18 appeared in a first location eighty times, a second location ten times, and a third location ten times. The expected location would be 1.3 or the first location.

Difficulty Index D follows:

$$D = \frac{\sum_1^n N_i i}{n \sum_1^n N_i} \qquad (2)$$

Difficulty Index D will produce values between 0.1 and 1.0. Value 0.1 indicates that each time spectral data from produce item 18 was captured, the candidate identification having the highest rank appeared in the first location. Value 1.0 indicates that each time spectral data from produce item 18 was captured, the candidate identification having the highest rank appeared in the last location. Thus, produce items having high values of Difficulty Index D require more choice locations than produce items having low values of Difficulty Index D.

Difficulty Index D is calculated during collection of reference produce data for produce data 30 and then dynamically updated during each capture of produce data.

A normalized rank $R_{norm}$ may be determined using Difficulty Index D:

$$R_{norm} = R \times D, \qquad (3)$$

where R is the initial rank.

Produce items which are difficult to identify with the spectral method will be weighted more heavily than produce items which are easier to identify. The index will increase the rankings of the candidate identifications for such produce items. Also, the index will increase the possibility that the candidate identifications for the produce items will appear in the first-displayed screen of candidate identifications, rather than later screens accessed through operator scrolling.

Advantageously, this method of weighting rankings can be applied as well to other produce recognition methods having inherent limitations.

Figure 3:
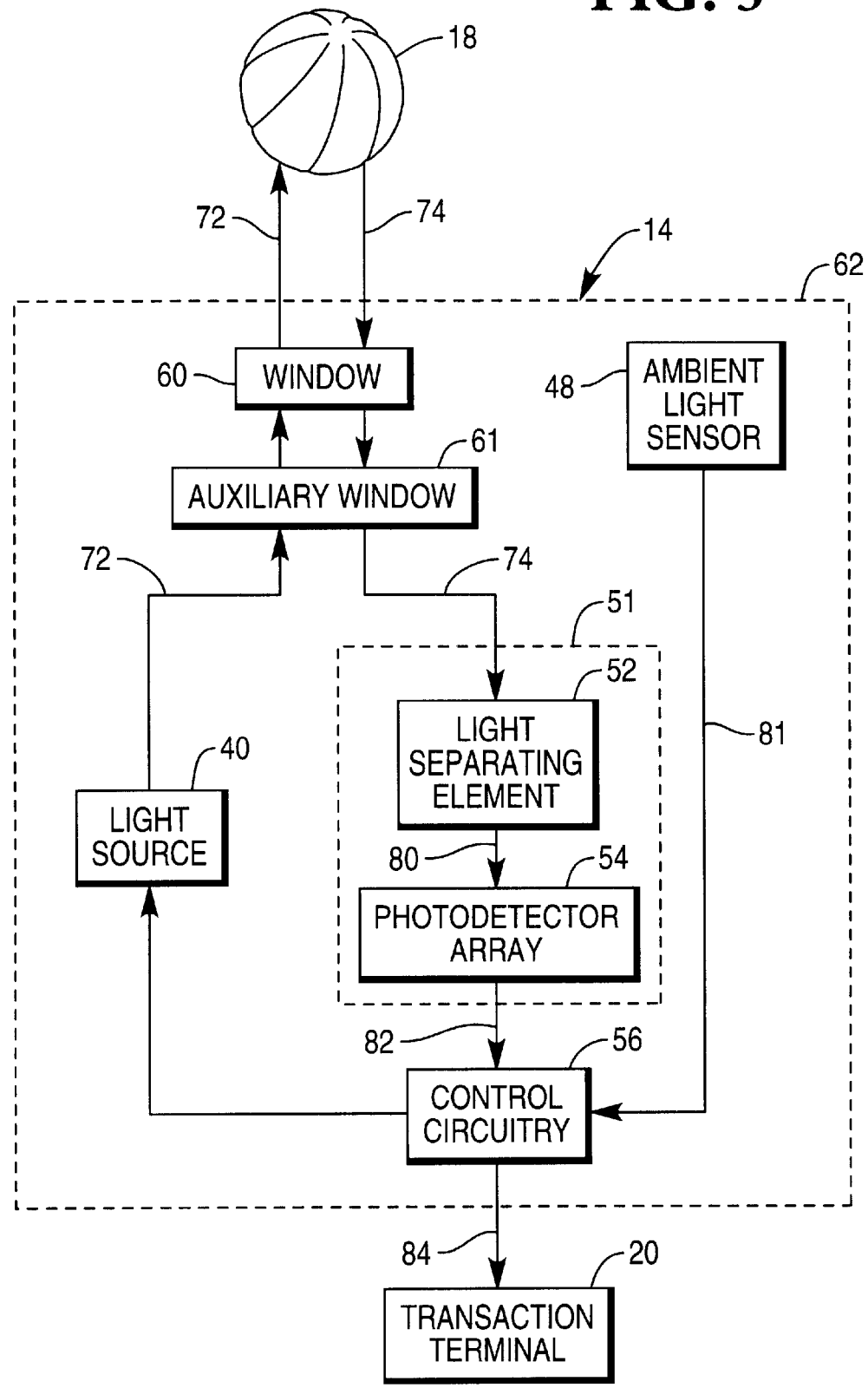
FIG. 3 is a block diagram of a type of spectral data collector.

Turning now to FIG. 3, an example spectral data collector 14 which relies on spectroscopic analysis is illustrated. Other types of spectral data collectors are also envisioned.

Example spectral data collector 14 primarily includes light source 40, spectrometer 51, control circuitry 56, transparent window 60, and housing 62.

Light source 40 produces light 70. Light source 40 preferably produces a white light spectral distribution, and preferably has a range from four hundred 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. Alternate embodiments include additional LEDs having different colors in narrower wavelength ranges and which are preferably used in combination with the broad-spectrum white light LED to even out variations in the spectral distribution and supplement the spectrum of the broad-spectrum white light LED.

Other types of light sources 40 are also envisioned by the present invention, although they may be less advantageous than the broad spectrum white LED. For example, a tungsten-halogen light may be used because of its broad spectrum, but produces more heat.

A plurality of different-colored LEDs having different non-overlapping wavelength ranges may be employed, but may provide less than desirable collector performance if gaps exist in the overall spectral distribution.

Ambient light sensor 48 senses the level of ambient light through windows 60 and 61 and sends ambient light level signals 81 to control circuitry 56. Ambient light sensor 48 is mounted anywhere within a direct view of window 61.

Spectrometer 51 includes light separating element 52 and photodetector array 54.

Light separating element 52 splits light 76 in the preferred embodiment into light 80 of a continuous band of wavelengths. Light separating element 52 is preferably a linear variable filter (LVF), such as the one manufactured by Optical Coating Laboratory, Inc., or may be any other functionally equivalent component, such as a prism or a grating.

Photodetector array 54 produces waveform signals 82 containing spectral data. The pixels of the array spatially sample the continuous band of wavelengths produced by light separating element 52, and produce a set of discrete signal levels. Photodetector array 54 is preferably a complimentary metal oxide semiconductor (CMOS) array, but could be a Charge Coupled Device (CCD) array.

Control circuitry 56 controls operation of spectral data collector 14 and produces digitized produce data waveform signals 84. For this purpose, control circuitry 56 includes an analog-to-digital (A/D) converter. A twelve bit A/D converter with a sampling rate of 22–44 kHz produces acceptable results.

Transparent window 60 is mounted above auxiliary transparent window 61. Windows 60 and 61 include an anti-reflective surface coating to prevent light 72 reflected from windows 60 and 61 from contaminating reflected light 74.

Housing 62 contains light source 40, ambient light sensor 48, spectrometer 51, photodetector array 54, control circuitry 56, auxiliary transparent window 61, and transparent window 60.

Figure 4:
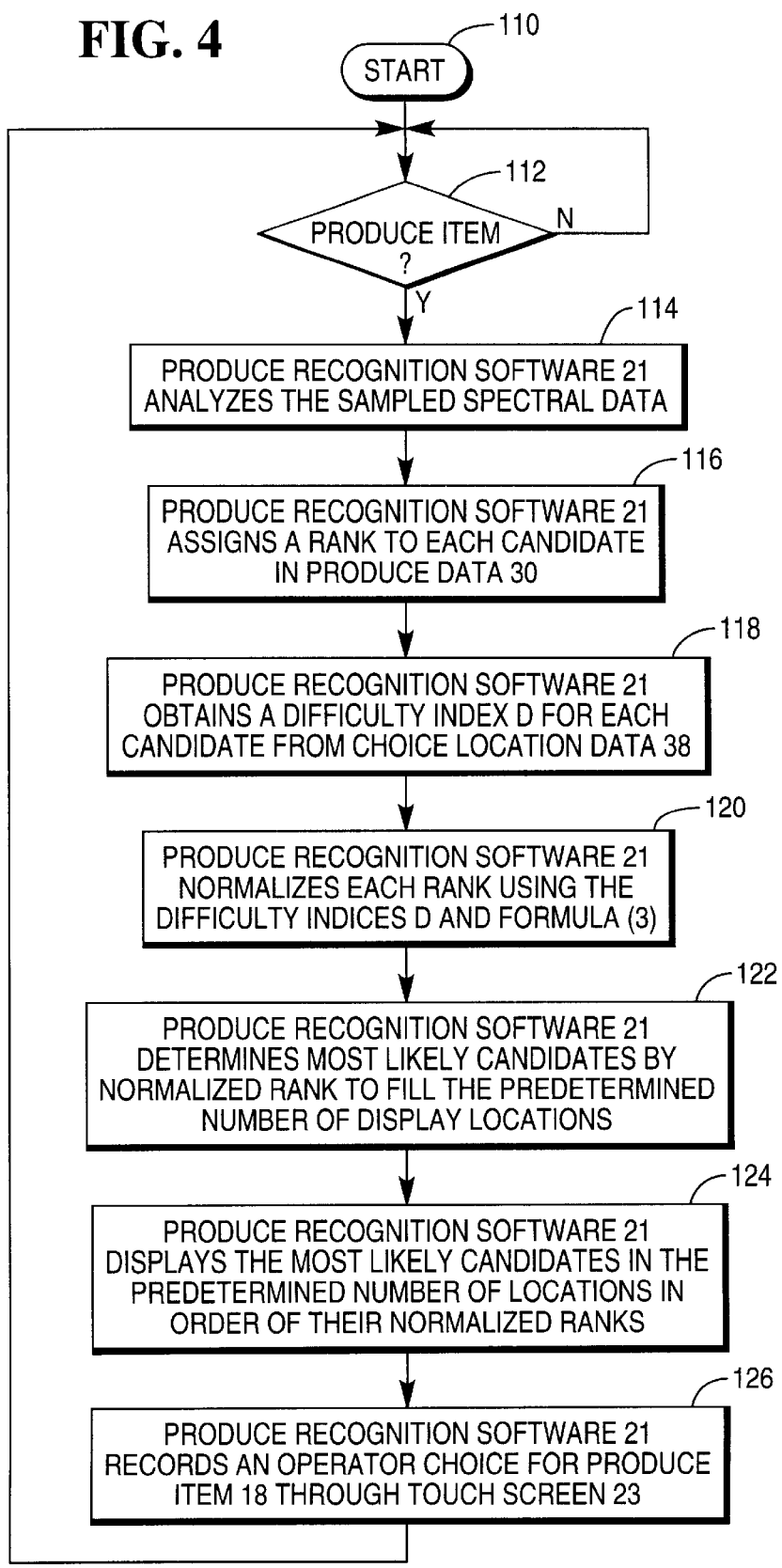
FIG. 4 is a flow diagram illustrating the produce recognition method of the present invention.

Turning now to FIG. 4, the produce recognition method of the present invention begins with START 110.

In step 112, produce recognition software 21 waits for spectral data from spectral data collector 14. Operation proceeds to step 114 following produce data collection.

In step 114, produce recognition software 21 analyzes the sampled spectral data.

In step 116, produce recognition software 21 assigns a rank to each candidate in produce data 30.

In step 118, produce recognition software 21 obtains a Difficulty Index D for each candidate from choice location data 38.

In step 120, produce recognition software 21 normalizes each rank using the Difficulty Indices D and formula (3).

In step 122, produce recognition software 21 determines most likely candidates by normalized rank.

In step 124, produce recognition software 21 displays the most likely candidates in order of their normalized ranks. Preferably, the top choices are displayed on a first page and additional choices are displayed on subsequent pages which an operator may access by scrolling.

In step 126, produce recognition software 21 records an operator choice for produce item 18 through touch screen 23. Transaction terminal 20 uses the identification information to obtain a unit price for produce item 18 from transaction server 24. Transaction terminal 20 then determines a total price by multiplying the unit price by weight information from scale 16. Operation returns to step 112 to wait for another produce item.

This technique increases the accuracy of produce recognition by giving greater weight to produce items more difficult to identify. In particular, it increases the accuracy of identifying such items by increasing the ranking of the produce items.

The technique also increases the speed with which items are identified. The difficult to identify items will be displayed on pages closer to the first page of candidates, thereby requiring less scrolling through subsequent pages.

Although the invention has been described with particular reference to certain preferred embodiments thereof, variations and modifications of the present invention can be effected within the spirit and scope of the following claims.

I claim:

1. A method of identifying a produce item comprising the steps of:
    collecting produce data from the produce item;
    comparing the produce data to reference produce data to obtain a list of candidate identifications with first rankings based upon probability of match;
    determining weights for the candidate identifications based upon numbers of times the candidate identifications were correct identifications and were displayed in predetermined operator selection screen locations during past recognition events;
    applying the weights to the candidate identifications to obtain second rankings;

displaying the candidate identifications in order of the second rankings; and recording an operator selection of one of the candidate identifications.

2. The method as recited in claim 1, wherein the produce data comprises spectral data.

3. A method of identifying a produce item comprising the steps of:

capturing spectral data from the produce item;

comparing the spectral data to reference spectral data to produce a list of first candidate identifications with first rankings based upon probability of match;

determining weights for second candidate identifications within the list of first candidate identifications whose corresponding produce items are more difficult to identify through spectral analysis than other produce items;

applying the weights to the second candidate identifications;

determining second rankings for first candidate identifications;

displaying the first candidate identifications in order of the second rankings; and recording an operator selection of one of the candidate identifications.

4. A method of identifying a produce item comprising the steps of:

capturing spectral data from the produce item;

comparing the produce data to reference spectral data to produce a list of candidate identifications with first rankings based upon probability of match;

increasing the rankings of a number of the candidate identifications whose corresponding produce items are more difficult to identify through spectral analysis than other produce items to produce second rankings;

displaying the candidate identifications in order of the second rankings; and recording an operator selection of one of the candidate identifications.

5. A method of displaying candidate identifications for a produce item for operator selection comprising the steps of:

determining first rankings for the candidate identifications from a comparison of collected produce data with reference produce data under a produce recognition method;

increasing the rankings of a number of the candidate identifications whose corresponding produce items are more difficult to identify than other produce items using the produce recognition method to produce second rankings;

displaying the candidate identifications in order of the second rankings; and recording an operator selection of one of the candidate identifications.

6. The method as recited in claim 5, wherein the produce data comprises spectral data.

7. A method of displaying candidate identifications for a produce item for operator selection comprising the steps of:

determining first rankings for the candidate identifications from a comparison of collected produce data with reference produce data;

determining weights for the candidate identifications based upon numbers of times the candidate identifications were correct identifications and were displayed in predetermined operator selection screen locations during previous recognition events;

applying the weights to the candidate identifications to obtain second rankings; and displaying the candidate identifications in order of the second rankings.

8. A method of displaying candidate identifications for a subject produce item for operator selection comprising the steps of:

determining first rankings for the candidate identifications from a comparison of collected produce data with reference produce data under a produce recognition method;

determining a number of choice locations for displaying the candidate identifications;

obtaining past recognition data including numbers of times correct candidate identifications for produce items associated with the candidate identifications have appeared in each of the choice locations in past recognition events;

determining expected locations within the choice locations for displaying the correct candidate identifications from the number of choice locations and the past recognition data;

determining weights for the candidate identifications from the expected locations and the number of choice locations;

applying the weights to the candidate identifications to obtain second rankings; and displaying the candidate identifications in order of the second rankings.

9. A produce recognition system comprising:

a produce data collector which collects produce data for a produce item; and a computer system which compares the produce data to reference produce data to obtain a list of candidate identifications with first rankings based upon probability of match, determining weights for the candidate identifications based upon numbers of times the candidate identifications were correct identifications and were displayed in predetermined operator selection screen locations during past recognition events, applies the weights to the candidate identifications to obtain second rankings, displays the candidate identifications in order of the second rankings, and records an operator selection of one of the candidate identifications.

10. A produce recognition system comprising:

a produce data collector which collects produce data for a produce item; and a computer system which compares the produce data to reference produce data to obtain a list of candidate identifications with first rankings based upon probability of match under a produce recognition method, increases the first rankings of a number of the candidate identifications whose corresponding produce items are more difficult to identify than other produce items using the produce recognition method to produce second rankings, displays the candidate identifications in order of the second rankings, and records an operator selection of one of the candidate identifications.

11. The produce recognition system as recited in claim 10, wherein the produce data collector comprises a spectrometer.

12. A produce recognition system comprising:

a produce data collector which collects produce data for a subject produce item; and a computer system which compares the produce data to reference produce data to obtain a list of candidate identifications, determines first rankings for the candidate identifications based upon probability of match, determines a number of choice locations for displaying the candidate identifications, obtains past recognition data including numbers of times correct candidate identifications for produce items associated with the candidate identifications have appeared in each of the choice locations in past recognition events, determines expected locations within the choice locations for displaying the correct candidate identifications from the number of choice locations and the past recognition data, determines weights for the candidate identifications from the expected locations and the number of choice locations, applies the weights to the candidate identifications to obtain second rankings, and displays the candidate identifications in order of the second rankings.

* * * * *